US009448452B2

(12) United States Patent
Lee

(10) Patent No.: US 9,448,452 B2
(45) Date of Patent: Sep. 20, 2016

(54) LIQUID CRYSTAL DISPLAY DEVICE WITH DOUBLE RATE DRIVING STRUCTURE WITH INCREASED APERTURE RATIO

(71) Applicant: LG Display Co., Ltd., Seoul (KR)

(72) Inventor: Min Jic Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 101 days.

(21) Appl. No.: 14/456,811

(22) Filed: Aug. 11, 2014

(65) Prior Publication Data

US 2015/0179121 A1    Jun. 25, 2015

(30) Foreign Application Priority Data

Dec. 20, 2013 (KR) .......................... 10-2013-0159949

(51) Int. Cl.
*G09G 3/36* (2006.01)
*G02F 1/1362* (2006.01)
*G02F 1/1343* (2006.01)

(52) U.S. Cl.
CPC ... *G02F 1/136227* (2013.01); *G02F 1/134363* (2013.01); *G09G 3/3659* (2013.01); *G09G 2300/0426* (2013.01); *G09G 2300/0434* (2013.01)

(58) Field of Classification Search
CPC .................. G02F 1/136227; G02F 1/134363; G09G 3/3659; G09G 2300/0426; G09G 2300/0434
See application file for complete search history.

(56) References Cited

U.S. PATENT DOCUMENTS

| 7,859,628 | B2* | 12/2010 | Park | G02F 1/134363 349/141 |
| 8,169,559 | B2* | 5/2012 | Woo | G02F 1/134363 345/96 |
| 8,345,204 | B2* | 1/2013 | Lee | G02F 1/1345 349/139 |
| 8,426,230 | B2* | 4/2013 | Lee | G02F 1/134363 257/88 |
| 8,717,523 | B2* | 5/2014 | Lee | G02F 1/1345 349/139 |
| 8,816,350 | B2* | 8/2014 | Sugihara | G02F 1/136286 257/71 |
| 8,830,411 | B2* | 9/2014 | Woo | G02F 1/134363 345/96 |

(Continued)

*Primary Examiner* — Lun-Yi Lao
*Assistant Examiner* — Peter D McLoone
(74) *Attorney, Agent, or Firm* — Fenwick & West LLP

(57) ABSTRACT

Disclosed is a liquid crystal display (LCD) device. The LCD device include first and second gate lines, data lines, a common electrode line formed between adjacent data lines and configured to perpendicularly cross the plurality of first and second gate lines and divide the plurality of pixel areas into first and second areas, first and second thin film transistors (TFTs) formed between a corresponding first gate line and a second gate line adjacent to the corresponding first gate line, a protective layer configured to include a first contact hole and a second contact hole, a common electrode formed on the protective layer and coupled to the common electrode line through the first contact hole, an insulation layer formed on the protective layer to cover the common electrode and a pixel electrode formed on the insulation layer.

10 Claims, 6 Drawing Sheets

(56) References Cited

U.S. PATENT DOCUMENTS

| | | | | |
|---|---|---|---|---|
| 8,854,562 B2* | 10/2014 | Kawabata | G02F 1/13439 | 349/36 |
| 8,958,041 B2* | 2/2015 | Park | G02F 1/134363 | 349/139 |
| 8,988,644 B2* | 3/2015 | Lee | G02F 1/134336 | 349/143 |
| 9,052,558 B2* | 6/2015 | Shiomi | G02F 1/136286 | |
| 9,116,400 B2* | 8/2015 | Song | G09G 3/3648 | |
| 9,151,972 B2* | 10/2015 | Jung | G02F 1/133305 | |
| 2003/0133066 A1* | 7/2003 | Ono | G02F 1/134363 | 349/141 |
| 2005/0140903 A1* | 6/2005 | Park | G02F 1/134363 | 349/141 |
| 2008/0259261 A1* | 10/2008 | Park | G02F 1/134363 | 349/139 |
| 2010/0110359 A1* | 5/2010 | Lee | G02F 1/1345 | 349/149 |
| 2010/0182522 A1* | 7/2010 | Woo | G02F 1/134363 | 349/37 |
| 2010/0182523 A1* | 7/2010 | Woo | G02F 1/134363 | 349/37 |
| 2011/0315991 A1* | 12/2011 | Sugihara | G02F 1/136286 | 257/59 |
| 2012/0057091 A1* | 3/2012 | Kawabata | G02F 1/13439 | 349/38 |
| 2012/0127412 A1* | 5/2012 | Lee | G02F 1/136286 | 349/139 |
| 2012/0218322 A1* | 8/2012 | Shiomi | G02F 1/136286 | 345/690 |
| 2012/0305947 A1* | 12/2012 | Lee | G02F 1/134363 | 257/88 |
| 2013/0093657 A1* | 4/2013 | Song | G09G 3/3648 | 345/92 |
| 2013/0293820 A1* | 11/2013 | Lee | G02F 1/134336 | 349/143 |
| 2014/0104528 A1* | 4/2014 | Jung | G02F 1/133305 | 349/43 |
| 2014/0152938 A1* | 6/2014 | Lee | G09G 3/3648 | 349/46 |
| 2015/0062510 A1* | 3/2015 | Chang | G02F 1/134336 | 349/110 |
| 2015/0243680 A1* | 8/2015 | Cho | G09G 3/3648 | 257/59 |

* cited by examiner

LIQUID CRYSTAL DISPLAY DEVICE WITH DOUBLE RATE DRIVING STRUCTURE WITH INCREASED APERTURE RATIO

CROSS-REFERENCE TO RELATED APPLICATIONS

This application claims the benefit of the Korean Patent Application No. 10-2013-0159949 filed on Dec. 20, 2013, which is hereby incorporated by reference as if fully set forth herein.

BACKGROUND

1. Field of the Invention

The present invention relates to a liquid crystal display (LCD) device, and more particularly, to an LCD device having a double reduced data (DRD) pixel structure for enhancing an aperture ratio.

2. Discussion of the Related Art

In LCD devices, two substrates in which electric field generating electrodes are formed are disposed so that surfaces with the electrodes formed thereon face each other, liquid crystal molecules are injected between the two substrates, a voltage is applied to the electrodes, the liquid crystal molecules are driven by an electric field generated with the voltage, and an image is displayed based on a light transmittance which is changed according to movements of the liquid crystal molecules.

In the LCD devices, a twisted nematic (TN) mode or an in-plane switching (IPS) mode which is a driving mode of each of the LCD devices is determined depending on positions of a common electrode and pixel electrode of a liquid crystal panel. In particular, the IPS mode, in which the common electrode and the pixel electrode are arranged in parallel on one substrate to generate a lateral electric field, has a broader viewing angle than the TN mode that generates a vertical electrical field.

Recently, an advanced high-IPS (AH-IPS) mode which is improved from the IPS mode and increases luminance has been proposed. In the AH-IPS mode, the common electrode and the pixel electrode are alternately arranged on different layers on one substrate to generate a fringe field, thereby realizing improved image-quality characteristic over that of the IPS mode.

The LCD devices include a liquid crystal panel, a gate driving circuit for driving a plurality of gate lines which are formed in the liquid crystal panel, and a data driving circuit for driving a plurality of data lines which are formed in the liquid crystal panel. As sizes of the LCD devices are enlarged and a resolution becomes higher, the number of driving circuits increases.

However, since the data driving circuit is relatively more expensive than other elements, research and development are done on technology for reducing the number of driving circuits so as to reduce the manufacturing cost of each LCD device. As an example of the technology, a double rate driving (DDR) structure has been proposed. In the DDR structure, although the number of gate lines increase by two times, the number of data lines decreases by half (½), and thus, the number of driving circuits decreases by half, and a resolution is maintained.

Hereinafter, a related art LCD device having a DRD pixel structure will be described with reference to FIGS. 1 to 3.

FIG. 1 is an equivalent circuit of the related art LCD device having the DRD pixel structure, and FIG. 2 is a plan view of the related art LCD device having the DRD pixel structure.

Referring to FIGS. 1 and 2, the related art LCD device having the DRD pixel structure includes two gate lines GL1 and GL2 which are formed on a substrate, a data line DL which is formed to cross the gate lines GL1 and GL2, and a common electrode line CL which is formed between adjacent data lines DL to cross the gate lines GL1 and GL2.

A plurality of pixels P1 and P2 are defined by the gate lines GL1 and GL2, the data line DL, and the common electrode line CL.

Each of the plurality of pixels P1 and P2 is coupled to the gate lines GL1 and GL2 and one data line DL.

In this case, first and second thin film transistors (TFTs) Tr1 and Tr2 which are coupled to the two gate lines GL1 and GL2 and the one data line DL are formed outside the two gate lines GL1 and GL2, which are formed in an alternating pattern.

In detail, the first and second TFTs Tr1 and Tr2 are disposed outside the gate lines GL1 and GL2, which are formed to be separated from each other and define pixel areas P1 and P2. The first TFT Tr1 is coupled to a first gate line GL1 and a first pixel P1, and the second TFT Tr2 is coupled to a second gate line GL2 and a second pixel P2.

A first contact hole CH1, which connects the common electrode line CL and a common electrode (not shown), is formed between the gate lines GL1 and GL2 which are alternately formed. A second contact hole CH2, which connects the first and second TFTs Tr1 and Tr2 to a pixel electrode PX, is formed outside the gate lines GL1 and GL2 which are alternately formed.

In this case, in order to reduce light leaking around the first and second contact holes CH1 and CH2, a black matrix BM having a certain length D is formed on an upper substrate (not shown) which is provided to face the substrate.

FIG. 3 is a cross-sectional view of the LCD device of FIG. 2, and is a view illustrating light leakage which occurs around the second contact hole CH2.

Referring to FIG. 3, the related art LCD device includes an active layer 13, a drain electrode 14b, a protective layer 16 including the second contact hole CH2 which exposes the drain electrode 14b, a common electrode CX, an insulation layer 17 including the second contact hole CH2, a pixel electrode PX which is coupled to the drain electrode 14b through the second contact hole CH2, and an alignment layer P1, which are sequentially formed on a substrate 10.

In this case, the alignment layer P1 flows down to the second contact hole CH2 due to a flowability of the material forming the alignment layer P1, and is non-uniformly formed around the second contact hole CH2 (see a circular block S). For this reason, light leakage occurs. To prevent the light leakage, the black matrix BM having the certain length D is formed on an upper substrate 20 which is provided to face the substrate 10.

In the related art LCD device having the DRD pixel structure, the black matrix BM having the certain length D is formed and covers an opening through which light from a backlight (not shown) passes, causing a reduction in a transmittance of a liquid crystal panel.

SUMMARY

Accordingly, the present disclosure is directed to provide an LCD device that substantially obviates one or more problems due to limitations and disadvantages of the related art.

An aspect of the present disclosure is directed to provide an LCD device which has an improved DRD pixel structure and increases an aperture ratio of a liquid crystal panel.

Additional advantages and features will be set forth in part in the description which follows and in part will become apparent to those having ordinary skill in the art upon examination of the following or may be learned from practice of the invention. The objectives and other advantages of the disclosure may be realized and attained by the structure particularly pointed out in the written description and claims hereof as well as the appended drawings.

To achieve these and other advantages and in accordance with the purpose of the invention, as embodied and broadly described herein, there is provided a liquid crystal display (LCD) device including: a plurality of first and second gate lines alternately formed on a substrate in one direction; a plurality of data lines configured to perpendicularly cross the plurality of first and second gate lines to define a plurality of pixel areas; a common electrode line formed between adjacent data lines, the common electrode configured to perpendicularly cross the plurality of first and second gate lines and divide the plurality of pixel areas into first and second areas; first and second thin film transistors (TFTs) formed between a corresponding first gate line and a second gate line adjacent to the corresponding first gate line, the first and second TFTs each including a gate electrode, an active layer, a source electrode, and a drain electrode; a protective layer including a first contact hole exposing the common electrode line and a second contact hole exposing a portion of the drain electrode; a common electrode formed on the protective layer, and coupled to the common electrode line through the first contact hole; an insulation layer formed on the protective layer to cover the common electrode, the insulation layer including the second contact hole exposing the portion of the drain electrode; and a pixel electrode formed on the insulation layer, the pixel electrode coupled to the drain electrode line through the second contact hole.

A pixel electrode formed in the first area may be coupled to an adjacent first TFT, wherein the common electrode line is between the pixel electrode in the first area and the adjacent first TFT, and a pixel electrode formed in the second pixel area may be coupled to a second TFT formed on the same axis as the pixel electrode, wherein the common electrode line is between the pixel electrode in the second pixel area and the second TFT formed on the same axis.

The pixel electrode formed in the first area may be coupled to the first TFT by a pixel connection part.

The first contact hole may be formed in an area adjacent to two of the second TFTs, among a plurality of areas between the first and second gate lines.

The first and second gate lines are formed as straight lines.

The second contact hole may be formed between the first and second gate lines.

The pixel electrode may be formed to overlap the first and second gate lines adjacent to the pixel electrode.

The common electrode may be formed at a whole surface of each of the plurality of pixel areas except the first contact hole.

A gate line, a common electrode, and a pixel electrode may be sequentially formed to overlap each other in a peripheral area of the second contact hole, and the common electrode may be formed longer than the gate line in a direction of the second contact hole.

The common electrode may be formed longer than the gate line by at least 2 µm.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Figure 1:
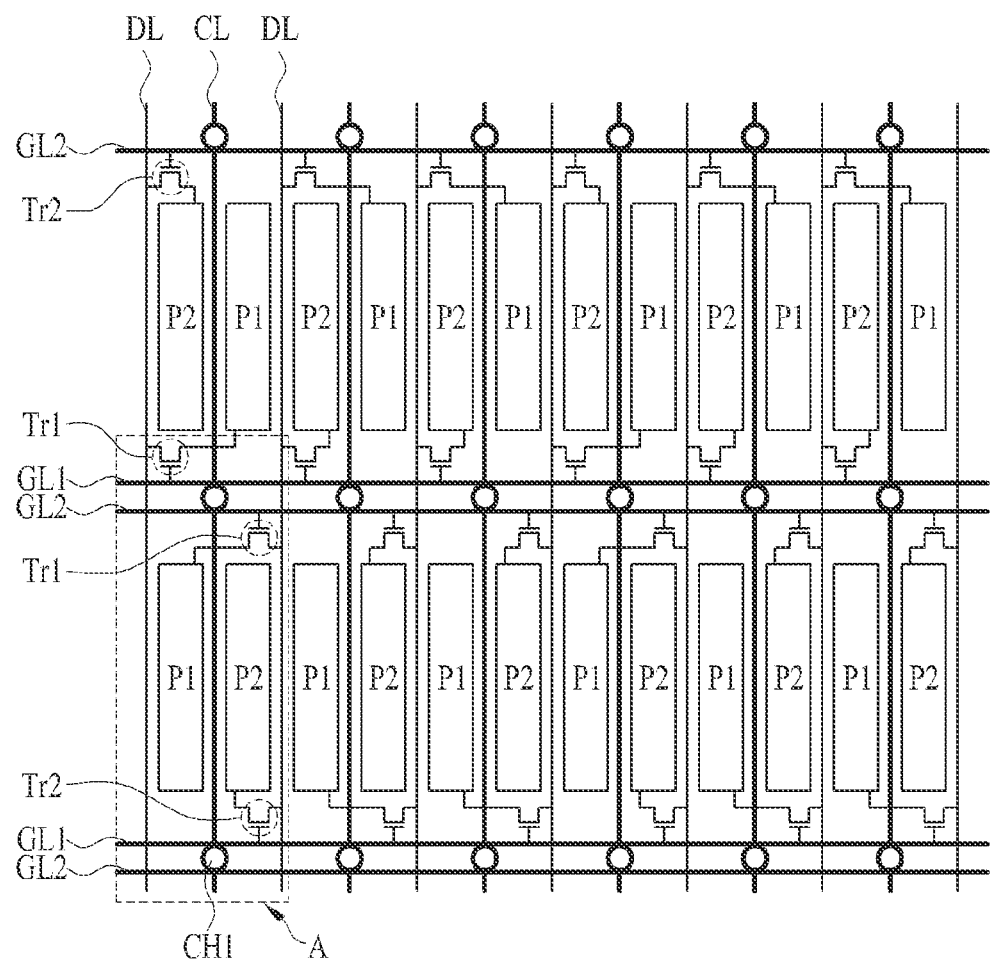
FIG. 1 is an equivalent circuit of the related art LCD device having the DRD pixel structure.
Figure 2:
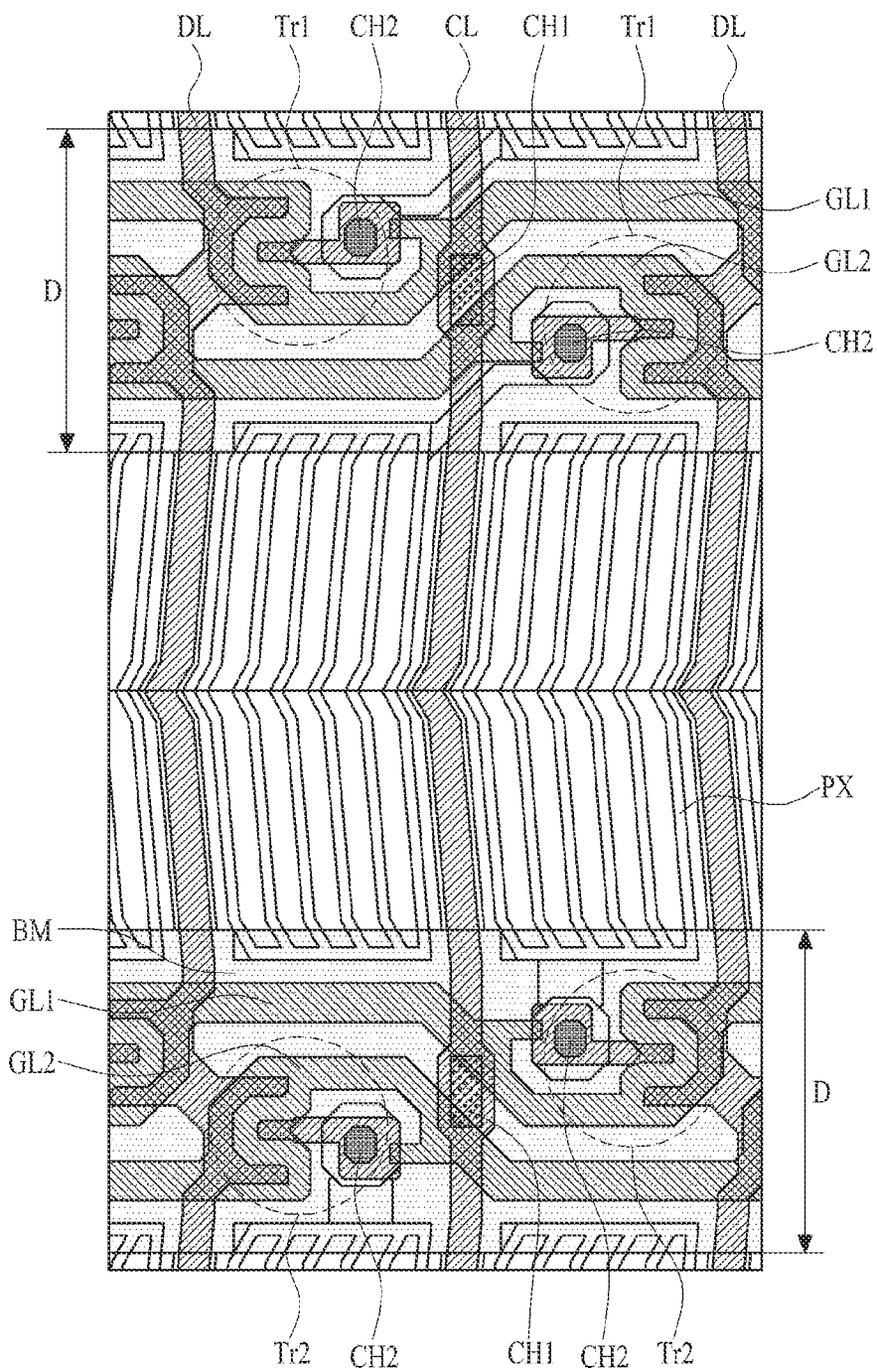
FIG. 2 is a plan view of the related art LCD device having the DRD pixel structure.
Figure 3:
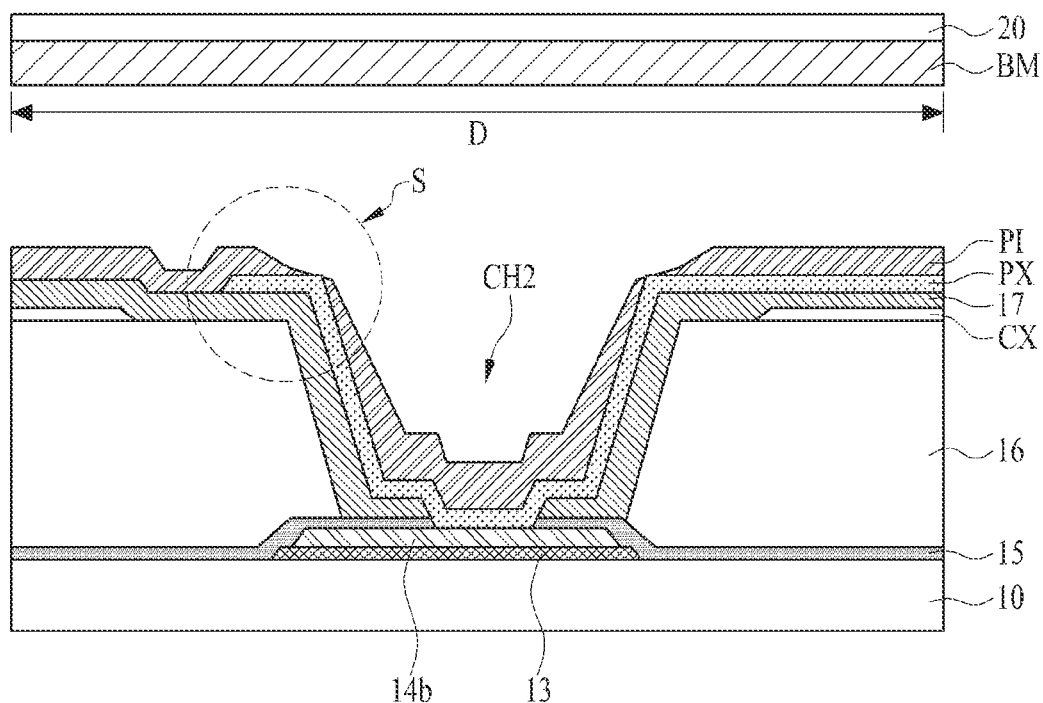
FIG. 3 is a cross-sectional view of the LCD device of FIG. 2.

Reference will now be made in detail to the exemplary embodiments of the present invention, examples of which are illustrated in the accompanying drawings. Wherever possible, the same reference numbers will be used throughout the drawings to refer to the same or like parts.

In the specification, in adding reference numerals for elements in each drawing, it should be noted that like reference numerals already used to denote like elements in other drawings are used for elements wherever possible.

The terms described in the specification should be understood as follows.

As used herein, the singular forms "a", "an" and "the" are intended to include the plural forms as well, unless the context clearly indicates otherwise. The terms "first" and "second" are for differentiating one element from the other element, and these elements should not be limited by these terms.

It should be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof.

The term "on" should be construed as including a case where one element is formed at a top of another element and moreover a case where a third element is disposed therebetween.

Hereinafter, embodiments of the present invention will be described in detail with reference to the accompanying drawings.

Figure 4:
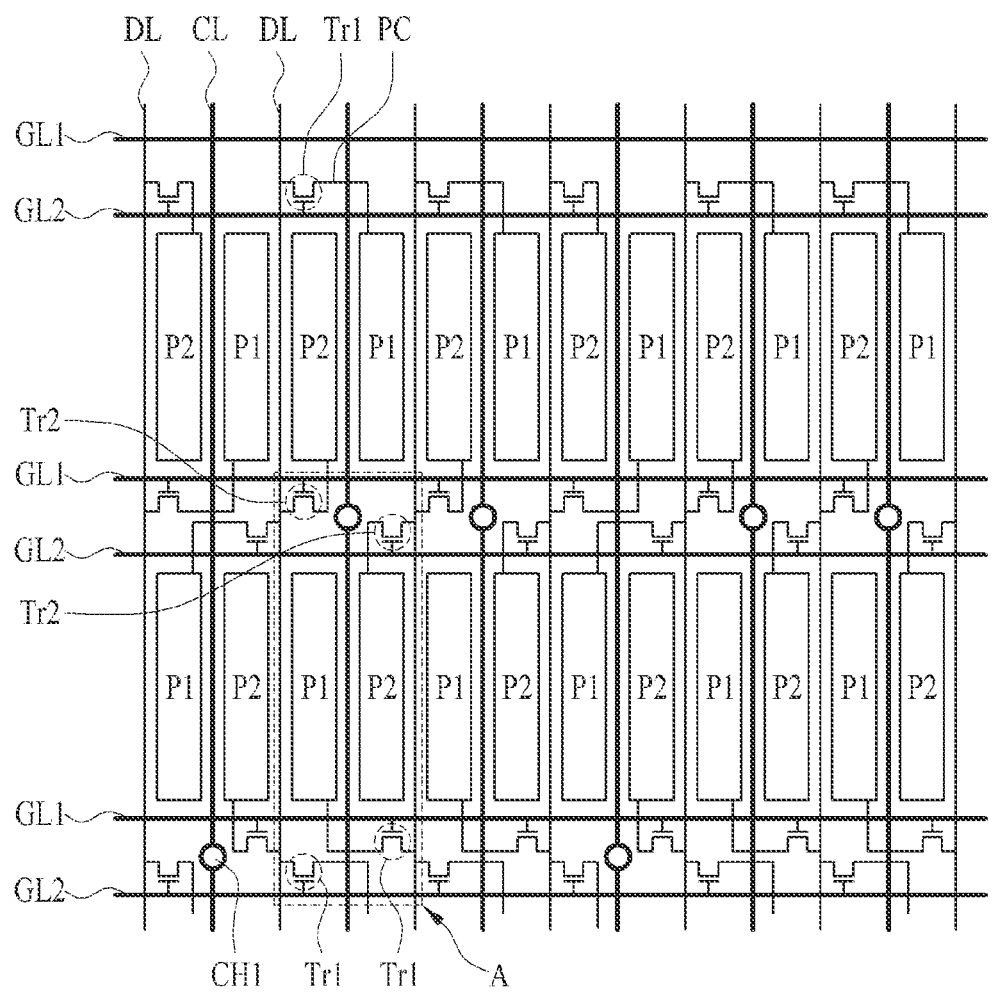
FIG. 4 is an equivalent circuit of an LCD device having a DRD pixel structure, according to one embodiment.

FIG. 4 is an equivalent circuit of an LCD device having a DRD pixel structure, according to one embodiment.

As seen in FIG. 4, the LCD device having the DRD pixel structure according to one embodiment includes a plurality of first and second gate lines GL1 and GL2, which are alternately formed as straight lines in one direction, and a plurality of data lines DL which perpendicularly cross the plurality of first and second gate lines GL1 and GL2 to define a plurality of pixel areas.

A common electrode line CL perpendicularly crosses the plurality of first and second gate lines GL1 and GL2, and is formed between adjacent data lines DL. Also, the common electrode line CL divides the plurality of pixel areas into first and second areas.

Here, a pixel area formed in the first area is referred to as a first pixel area P1, and a pixel area formed in the second area is referred to as a second pixel area P2.

First and second TFTs Tr1 and Tr2 are coupled to one data line DL and two gate lines GL1 and GL2.

Moreover, the first and second TFTs Tr1 and Tr2 are formed between two gate lines GL1 and GL2 which are alternately formed.

A pixel electrode formed in the first pixel area P1 is coupled to an adjacent first TFT Tr1 with the common electrode line CL between the pixel electrode formed in the first area and the adjacent first TFT TR1, and a pixel electrode formed in the second pixel area P2 is coupled to the second TFT Tr2, which is formed on the same axis as that of the pixel electrode, with the common electrode line CL between the second TFT Tr2 and the common electrode line CL.

In this case, the first TFT Tr1 and the pixel electrode which is formed in the first pixel area P1 are coupled to each other by a pixel connection part PC which is formed across the common electrode line CL.

That is, the LCD device according to one embodiment uses a DRD type in which liquid crystal cells formed in the pixel areas P1 and P2 are driven by using two gate lines GL1 and GL2 and one data line DL.

In this case, according to an embodiment, the first and second TFTs Tr1 and Tr2 are formed between the two gate lines GL1 and GL2 which are alternately formed as straight lines, thus enlarging each pixel area and increasing an aperture ratio.

A description of this will be made in detail with reference to FIG. 5.

Figure 5:
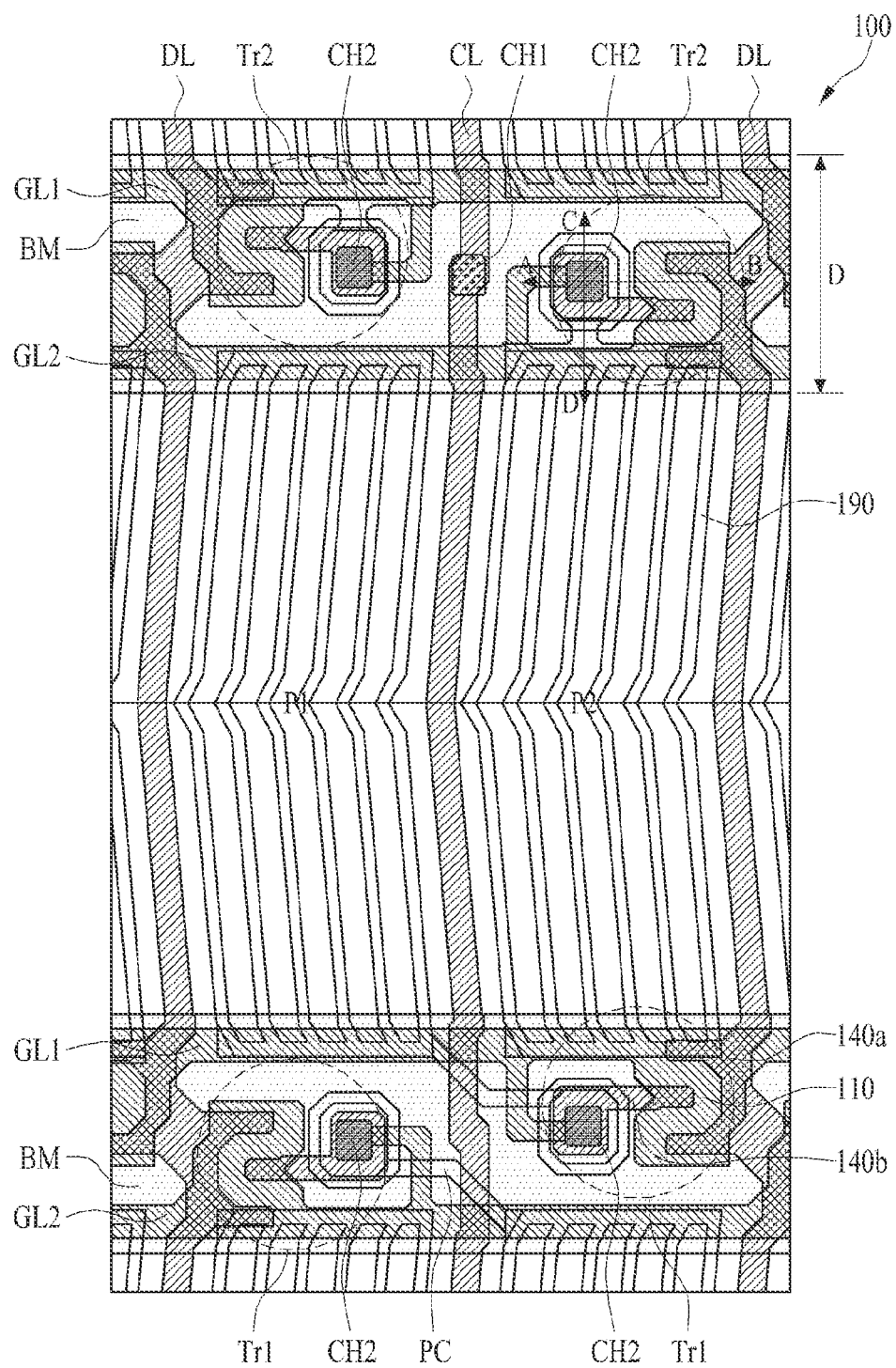
FIG. 5 is a plan view schematically illustrating an LCD device according to one embodiment.

FIG. 5 is a plan view schematically illustrating an LCD device according to one embodiment, and is a plan view of an area A in the equivalent circuit of FIG. 4. Therefore, like reference numerals refer to like elements throughout, and thus, a description on the same element is not repeated.

As seen in FIG. 5, the first and second TFTs Tr1 and Tr2, which each includes a gate electrode 110, an active layer (not shown), a source electrode 140a, and a drain electrode 140b, are formed between a first gate line GL1 and a second gate line GL2 adjacent to the first gate line GL1.

In more detail, two gate lines GL1 and GL2 are formed as straight lines, and the first and second TFTs Tr1 and Tr2 are formed inside (i.e., between) the two gate lines GL1 and GL2.

A contact hole CH2, which connects the first and second TFTs Tr1 and Tr2 to a pixel electrode 190, is formed between the two gate lines GL1 and GL2. The pixel electrode 190 is formed to overlap a first gate line GL1, which is formed on the pixel area, and a second gate line GL2 formed under the pixel area.

In the LCD device according to one embodiment, a plurality of the second contact holes CH2 may be formed in a direction parallel with each other, and thus, a black matrix BM for covering light leakage in the second contact hole CH2 may be formed narrower than a related art second contact hole which is obliquely formed.

That is, a length D of the black matrix BM for covering the second contact hole CH2 and the two gate lines GL1 and GL2 (which are alternately formed) is shorter than that of a related art black matrix, thereby increasing an aperture ratio.

The related art LCD device shows a transmittance of 3.37%, but the LCD device according to an embodiment of the present disclosure shows a transmittance of 4.41%. That is, according to one embodiment, a transmittance can increase by about 30%.

A common electrode (not shown) is coupled to the common electrode line CL through a first contact hole CH1, and is formed on a whole surface of a pixel area except the first contact hole CH1.

In this case, the first contact hole CH1 is formed on the common electrode line CL, and particularly, is formed between first and second gate lines GL1 and GL2 with the second TFT Tr2 formed therein. However, the first contact hole CH1 is not formed between first and second gate lines GL1 and GL2 with the first TFT Tr1 formed therein That is, the first contact hole CH1 is formed in only an area (to which two the second TFTs are adjacent) among a plurality of areas between the first and second gate lines, but is not formed in an area to which two the first TFTs are adjacent.

The first TFT Tr1 is coupled to the pixel electrode 190 through a pixel connection part PC. The pixel electrode 190 is formed in the first pixel area P1 adjacent to the first TFT Tr1, with the common electrode line CL between the first TFT Tr1 and the pixel electrode 190.

In this case, when the first contact hole CH1 is formed between a plurality of the pixel connection parts PC, a distance between the pixel connection parts PC becomes narrow, causing a short-circuit defect. Therefore, the first contact hole CH1 is not formed between the first and second gate lines GL1 and GL2 with the first TFT Tr1 formed therein.

Figure 6:
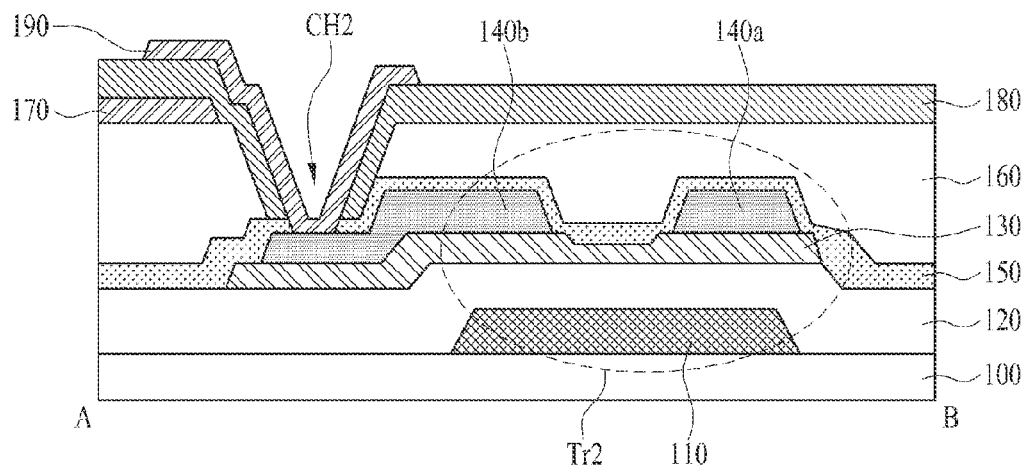
FIG. 6 is a cross-sectional view taken along line A-B of the LCD device of FIG. 5.

FIG. 6 is a cross-sectional view taken along line A-B of the LCD device of FIG. 5. Like reference numerals refer to like elements throughout, and descriptions of elements described with respect to FIG. 5 are not repeated.

As seen in FIG. 6, the LCD device according to an embodiment includes a second TFT Tr2 formed on a substrate 100, an inter-layer insulation layer 150 which includes the second TFT Tr2 and is formed on the substrate 100, a protective layer 160, a common electrode 170 formed on the protective layer 160, an insulation layer 180 which includes the common electrode 170 and is formed on the protective layer 160, and a pixel electrode 190 formed on the insulation layer 180.

The substrate 100 mainly uses glass, but may use transparent plastic (for example, polyimide) which is bendable or flexible. Polyimide, which endures under a high temperature and has good heat-resistant properties, may be used in the case that a high-temperature deposition process is performed on the substrate 100.

The second TFT Tr2 includes a gate electrode 110, an active layer 130, a source electrode 140a, and a drain electrode 140b.

The gate electrode 110 is formed as a pattern on the substrate 100.

The gate electrode 110 may be patterned simultaneously with the first and second gate lines GL1 and GL2, and may be formed of molybdenum, aluminum, gold, titanium, neodymium, copper, or an alloy thereof. In addition, the gate electrode 110 may be formed of a single layer or multi-layer (which includes two or more layers) of the metal or alloy.

The gate insulation layer 120 may be formed of an inorganic-based insulating material such as silicon oxide or silicon nitride, but is not limited thereto. For example, the gate insulation layer 120 may be formed of an organic-based insulating material such as photo acryl or benzocyclobutene (BCB).

The active layer 150 overlaps the gate electrode 110, and is formed as a pattern on the gate insulation layer 120.

The active layer 150 may be formed of an oxide semiconductor such as In—Ga—Zn—O (IGZO), but is not limited thereto.

The source electrode 140a and the drain electrode 140b are separated from each other, and are formed as a pattern on the active layer 150 to face each other.

The inter-layer insulation layer 130, the protective layer 160, and the insulation layer 180 include a second contact hole CH2 which exposes the drain electrode 140b.

The common electrode 170 is formed on the protective layer 160, and the pixel electrode 190 coupled to the drain electrode 140b is formed on the insulation layer 180.

Figure 7:
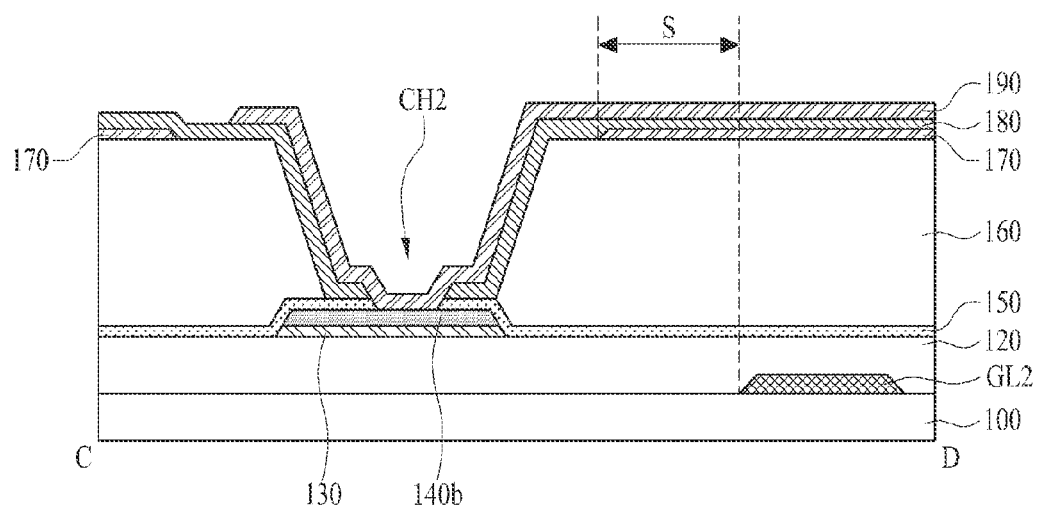
FIG. 7 is a cross-sectional view taken along line C-D of the LCD device of FIG. 5.

FIG. 7 is a cross-sectional view taken along line C-D of the LCD device of FIG. 5. Like reference numerals refer to like elements throughout, and descriptions of elements described with respect to FIG. 5 are not repeated.

As shown in FIG. 7, the LCD device according to an embodiment includes a second gate line GL2 formed on a substrate 100, a gate insulation layer 120, a second TFT Tr2 including an active layer 130 and a drain electrode 140b, an inter-layer insulation layer 150 including a second contact hole CH2, a protective layer 160, an insulation layer 180, a common electrode 170 which is formed on the protective layer 160, a common electrode 170 formed on the protective layer 160, and a pixel electrode 190 which is formed on the insulation layer 180 and is coupled to the drain electrode 140b.

The second gate line GL2, the common electrode 170, and the pixel electrode 190 are formed to overlap each other in a peripheral area of the second contact hole CH2, and the common electrode 170 is formed to be longer than the second gate line GL2 in the second contact hole CH2 direction.

In particular, the common electrode 170 may be formed to be longer than the second gate line GL2 by 2 μm or more.

In this case, since the second gate line GL2 and the pixel electrode 190 are formed to overlap each other, a parasitic capacitance is generated. However, since the common electrode 170 is formed between the second gate line GL2 and the pixel electrode 190, the parasitic capacitance is not generated.

However, an overlay of the second gate line GL2 and the common electrode 170 is twisted, and for this reason, when the common electrode 170 does not cover the second gate line GL2, a parasitic capacitance is generated between the second gate line GL2 and the pixel electrode 190.

To prevent such a problem, the common electrode 170 according to an embodiment is formed to be longer than the second gate line GL2 in the second contact hole CH2 direction, and for example, may be formed to be longer than the second gate line GL2 by 2 μm or more.

As described above, the two gate lines GL1 and GL2 are formed as straight lines, and the second contact hole CH2 which exposes the drain electrode 140b is formed between the two gate lines GL1 and GL2. Therefore, a length of the black matrix BM which is formed on the two gate lines GL1 and GL2 and the second contact hole CH2 is reduced, and thus, the aperture ratio of the liquid crystal panel is increased, thereby enhancing a quality of an image produced by the liquid crystal panel.

Moreover, according to the embodiments of the present disclosure, the second gate line GL2, the common electrode 170, and the pixel electrode 190 are sequentially formed in the peripheral area of the second contact hole CH2 to overlap each other, and the common electrode 170 is formed to be longer than the second gate line GL2 in the second contact hole CH2 direction, thereby decreasing a parasitic capacitance generated between the second gate line GL2 and the pixel electrode 190.

In addition to the aforesaid features and effects, other features and effects of the present disclosure can be newly construed from the embodiments described herein.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A liquid crystal display (LCD) device comprising:
    a first pair of gate lines including a first gate line and a second gate line adjacent to the first gate line;
    a second pair of gate lines including a third gate line and a fourth gate line adjacent to the third gate line;
    a plurality of data lines configured to perpendicularly cross the first, second, third, and fourth gate lines to define a plurality of pixel areas between the second and the third gate lines and a plurality of non-pixel areas between the first and the second gate lines and between the third and the fourth gate lines;
    a plurality of common electrode lines each of which is formed between adjacent data lines, the common electrode lines configured to perpendicularly cross the first, the second, the third and the fourth gate lines and divide the plurality of pixel areas into first and second areas, the first area and the second area of one of the plurality of pixel areas being between a pair of adjacent data lines, the first area and the second area of said one of the plurality of pixel areas being on opposite sides of one of the common electrode lines, the first area of said one of the plurality of pixel areas coupled to the second gate line and the second area of said one of the plurality of pixel areas coupled to the third gate line, and both the first and second areas of said one of the plurality of pixel areas coupled to a same one of the data lines;
    a plurality of first and second thin film transistors (TFTs), the first TFTs in the non-pixel areas between the first and the second gate lines and the second TFTs in the non-pixel areas between the third and the fourth gate lines, the first and the second TFTs each including a gate electrode, an active layer, a source electrode, and a drain electrode, and the first area of said one of the plurality of pixel areas coupled to the second gate line through a corresponding one of the first TFTs and the second area of said one of the plurality of pixel areas coupled to the third gate line through a corresponding one of the second TFTs;
    a protective layer including a first contact hole exposing one of the common electrode lines and a second contact hole exposing a portion of the drain electrode of the corresponding one of the first TFTs or the corresponding one of the second TFTs;

a common electrode formed on the protective layer, and coupled to said one of the common electrode lines through the first contact hole;

an insulation layer formed on the protective layer to cover the common electrode, the insulation layer including the second contact hole exposing the portion of the drain electrode of the corresponding one of the first TFTs or the corresponding one of the second TFTs; and a pixel electrode formed on the insulation layer, the pixel electrode coupled to the drain electrode of the corresponding one of the first TFTs or the corresponding one of the second TFTs through the second contact hole.

2. The LCD device of claim 1, wherein, a pixel electrode formed in the first area of said one of the plurality of pixel areas is coupled to the corresponding one of the first TFTs, wherein one of the common electrode lines is between the pixel electrode in the first area of said one of the plurality of pixel areas and the corresponding one of the first TFTs, and a pixel electrode formed in the second area of said one of the plurality of pixel areas is coupled to the corresponding one of the second TFTs formed on the same axis as the pixel electrode, wherein said one of the common electrode lines is between the pixel electrode in the second area and the corresponding one of the second TFTs formed on the same axis.

3. The LCD device of claim 2, wherein the pixel electrode formed in the first area of said one of the plurality of pixel areas is coupled to the corresponding one of the first TFTs by a pixel connection part.

4. The LCD device of claim 2, wherein the first contact hole is formed in an area adjacent to two of the second TFTs, among the non-pixel areas between the third and fourth gate lines.

5. The LCD device of claim 1, wherein the first, the second, the third, and the fourth gate lines are formed as straight lines.

6. The LCD device of claim 1, wherein the second contact hole is formed between the first and the second gate lines or the third and the fourth gate lines.

7. The LCD device of claim 1, wherein the pixel electrode formed in the first area of said one of the plurality of pixel areas or the second area of said one of the plurality of pixel areas is formed to overlap the second and the third gate lines adjacent to the pixel electrode formed in the first area of said one of the plurality of pixel areas or the second area of said one of the plurality of pixel areas.

8. The LCD device of claim 1, wherein the common electrode is formed at a whole surface of said one of the plurality of pixel areas except the first contact hole.

9. The LCD device of claim 1, wherein, a gate line, the common electrode, and the pixel electrode formed in the first area of said one of the plurality of pixel areas or the second area of said one of the plurality of pixel areas are sequentially formed to overlap each other in a peripheral area of the second contact hole, and the common electrode is formed longer than the gate line in a direction of the second contact hole.

10. The LCD device of claim 9, wherein the common electrode is formed to be longer than the gate line by at least 2 μm.

* * * * *